United States Patent [19]

Paar

[11] Patent Number: 5,008,351

[45] Date of Patent: Apr. 16, 1991

[54] REACTING EPOXY RESIN AND SUBSTITUTED UREA OR BIURET WITH BLOCKED ISOCYANATE GROUP DICARBOXYLIC ANHYDRIDE COMPOUND PRODUCT

[75] Inventor: Willibald Paar, Graz, Austria

[73] Assignee: Vianova Kunstharz, A.G., Werndorf, Austria

[21] Appl. No.: 351,477

[22] Filed: May 15, 1989

Related U.S. Application Data

[62] Division of Ser. No. 195,290, May 18, 1988, Pat. No. 4,851,486.

[30] Foreign Application Priority Data

May 18, 1987 [AT] Austria ................................. 1248/87

[51] Int. Cl.$^5$ ...................... C08G 18/06; C08G 59/14; C08G 63/68
[52] U.S. Cl. ................................. 525/528; 523/410; 523/415; 523/416; 523/417; 528/107; 528/113
[58] Field of Search ............... 523/410, 415, 416, 417; 525/528; 528/107, 113

[56] References Cited

U.S. PATENT DOCUMENTS

| | | | |
|---|---|---|---|
| 4,190,564 | 2/1980 | Tominaga et al. | 523/415 |
| 4,251,415 | 2/1981 | Nakada et al. | 523/417 |
| 4,274,989 | 6/1981 | Tominaga et al. | 523/415 |
| 4,315,840 | 2/1982 | Kempter et al. | 523/415 |
| 4,536,525 | 8/1985 | Freese et al. | 523/414 |
| 4,711,934 | 12/1987 | Paar et al. | 523/414 |
| 4,721,742 | 1/1988 | Bertram et al. | 523/417 |
| 4,727,098 | 2/1988 | Paar et al. | 523/414 |
| 4,777,225 | 10/1988 | Paar | 523/416 |
| 4,781,808 | 11/1988 | Geist et al. | 523/410 |

*Primary Examiner*—John C. Bleutge
*Assistant Examiner*—Robert E. L. Sellers, II
*Attorney, Agent, or Firm*—Breiner & Breiner

[57] ABSTRACT

Self-crosslinking cationic paint binders based on ureide-modified epoxy resins; the preparation of these binders and their use, particularly in electrodeposition paints, is described. The modification is effected with carboxylic compounds carrying ureide groups, blocked isocyanate groups and, optionally, tertiary amino groups. The carboxylic compounds are obtained through reaction of dicarboxylic acid anhydrides or compounds carrying dicarboxylic acid anhydrides with a substituted urea or a substituted biuret. The products show excellent resistance and adhesion characteristics.

9 Claims, No Drawings

REACTING EPOXY RESIN AND SUBSTITUTED UREA OR BIURET WITH BLOCKED ISOCYANATE GROUP DICARBOXYLIC ANHYDRIDE COMPOUND PRODUCT

This is a division of application Ser. No. 07/195,290 filed May 18, 1988, now U.S. Pat. No. 4,851,486.

FIELD OF INVENTION

The invention is directed to self-crosslinking cationic paint binders based on ureide-modified epoxy resins; to the preparation of these products, and to their use, particularly in electrodeposition paints.

BACKGROUND OF INVENTION

The modification of epoxy resins in the preparation of cationic paint binders is extensively described in the literature. Such modifications include the introduction of protonable groups, as well as the extension of the polymer chain by reaction with polyfunctional compounds, such as difunctional compounds, or through the introduction of groups which serve to crosslink the applied paint films.

The molecular constituents heretofore used to prolong the chain are either simple difunctional compounds such as diphenols, diols or dicarboxylic acids, or the more complex intermediates which, in addition to their function as chain extenders, carry groups which influence the applied paint film, such as the longer hydrocarbon radicals, polyglycol radicals, urea, or amide groups. Crosslinkable groups such as polymerizable double bonds or blocked isocyanate groups can be introduced through reaction of corresponding monoisocyanate compounds with the hydroxy groups of the resin.

GENERAL DESCRIPTION OF INVENTION

It has now been found that the properties of cationic paint binders and the coatings prepared therefrom can be enhanced through the incorporation of ureide groups and blocked isocyanate groups, as well as carboxylic compounds optionally carrying tertiary amino groups.

Thus, the present invention is concerned with self-crosslinking cationic paint binders based on amino-modified epoxy resin esters, characterized in that they are obtained through esterification of 5 to 100, preferably 60 to 100, mole-% of the epoxy groups of polyepoxy resins, such as the diepoxy resins, with an epoxy equivalent weight of 160 to about 2000, with carboxylic compounds of the formula —

wherein —

R₁ is a saturated or unsaturated aliphatic, cycloaliphatic, or aromatic hydrocarbon radical,
R₂ is an aliphatic hydrocarbon radical, optionally carrying a tertiary amino group,
R₃ is an aliphatic, cycloaliphatic, or aromatic hydrocarbon radical, and
—/NCO/ is a blocked isocyanate group, or the group —NR₂—CO—NH—R₃—/NCO/ is a radical formed from a substituted urea or a substituted biuret carrying at least one blocked isocyanate group and, optionally, a tertiary amino group,
and reaction of any remaining epoxy groups of the reaction product with primary and/or secondary amines, or with additional modifiers if desired, to an epoxy group free amine-modified epoxy resin ester with an amine value of at least 30 mg KOH/g.

The invention is further concerned with the process for producing these self-crosslinking cationic paint binders based on amine-modified epoxy resin esters, characterized in that 5 to 100, preferably 60 to 100, mole-% of the epoxy groups of an epoxy resin with an epoxy equivalent weight of 160 to 2000 are reacted with a carboxylic compound of the formula —

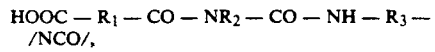

wherein the radicals have the meaning as above set forth, and, in a separate step or jointly with the carboxylic compound, with primary and/or secondary amines, and, if desired, with additional modifiers, whereby the weight ratios are chosen in order that the final product has no free epoxy groups and has an amine value of at least 30 mg KOH/g.

Furthermore, the invention is concerned with the use of the cationic paint binders of this invention in the formulation of stoving paints, water-dilutable upon protonation, particularly in cathodically depositable electrodeposition paints.

The carboxylic compounds used according to the invention of the formula —

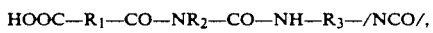

wherein —

R₁ is a saturated or unsaturated aliphatic, cycloaliphatic, or aromatic hydrocarbon radical,
R₂ is an aliphatic hydrocarbon radical, optionally carrying a tertiary amino group,
R₃ is an aliphatic, cycloaliphatic, or aromatic hydrocarbon radical, and
—/NCO/ is a blocked isocyanate group, or the group —NR₂—CO—NH—R₃—/NCO/ is a radical formed from a substituted urea or a substituted biuret carrying at least one blocked isocyanate group and, optionally, a tertiary amino group,
are obtained through reaction of a substituted urea carrying at least one hydrogen atom linked to the nitrogen atom or with a substituted biuret, with a dicarboxylic acid anhydride or a compound carrying dicarboxylic acid anhydride groups.

The substituted urea can be prepared in many ways. Products used to advantage are the reaction products of primary amines with semi-blocked diisocyanates. Primary-tertiary diamines, such as N,N-dialkylamino alkylamine, are particularly preferred. The presence of the tertiary amino group, on the one hand, catalyzes the reaction; and, on the other hand, a part of the protonable nitrogen groups necessary for water-dilutability is introduced.

A second group of substituted ureas particularly suitable for use according to this invention is obtained from secondary amines of the type formed on the aminoalkylation of phenols with primary amines and formaldehyde, through reaction with semi-blocked diisocyanates. Such reaction products are described in U.S. Pat. No. 4,711,934, corresponding to EP-A-0 209 857, or U.S. application Ser. No. 895,476 filed Aug. 11, 1986,now abandoned, corresponding to AT-PS 382 633, as intermediates. Substituted biuret compounds are disclosed in Austrian Patent Application No. A 967/87, corresponding to U.S. application Ser. No. 182,358 filed Apr. 18, 1988, now U.S. Pat. No. 4,808,688, whereby such intermediates obtained through reaction of the above-mentioned substituted ureas with semi-blocked diisocyanates. The disclosures of the aforesaid patents and applications are incorporated herein by reference.

The preferred dicarboxylic acid anhydrides include o-phthalic acid anhydride, tetrahydro-, endomethylenetetrahydro-, and hexahydrophthalic acid anhydride, their nucleus-substituted products, maleic acid anhydride, or succinic acid anhydride.

In a preferred embodiment, as the compound carrying dicarboxylic acid groups, addition compounds of maleic acid anhydride with long chain compounds carrying isolated double bonds are used, as are the natural or synthetic polyesters of drying fatty acids or the liquid diene polymers, for example the relatively low molecular polybutadienes. The succinic acid anhydride configuration of such addition compounds enables them to be used in ureide formation.

The ureide formation is carried out at 80° C. to 120° C. and is maintained until the acid value corresponding to one free carboxy group is attained. The carboxylic compounds thus obtained are reacted completely at 70° C. to 120° C. with a polyepoxy resin such as the diepoxides. The epoxy resins preferred for the products of the invention are the diglycidyl ethers of bisphenol A or bisphenol F, the polyglycidyl ethers of novolak resins, the diglycidyl ethers of polyols, and mixtures thereof.

According to the invention, 5 to 100, preferably 60 to 100, mole-% of the epoxy groups of the epoxy resin are reacted with the carboxy compound. The remaining epoxy groups are reacted in known manner with primary or secondary amines and optionally modifiers such as carboxylic acids or pnenols, etc.; the weight ratios being cnosen in order that the epoxy group-free final product has an amine value of at least 30 mg KOH/g. The preferred amines for this purpose are alkanol amines, such as diethanol amine, diisopropanol amine, methylethanol amine; or primary amines, such as dimethylaminopropylamine or diethylaminopropylamine.

The binders prepared according to the present invention are dilutable with water after partial neutralization of the basic groups and, after dilution, form stable clear or opaque solutions. Prior to application they are optionally mixed with pigments, extenders, catalysts, or other conventional paint additives. The preparation of such water-dilutable paints is known to those skilled in the art. The preferred method of application for paints based on the binders of the present invention is electrodeposition coating, the products, due to their cationic character, being deposited on the cathode of the electrodeposition system.

After demasking of the isocyanate groups at elevated temperature, the products are self-crosslinking through urethane formation. The products can also contain further crosslinking agents or additional resins to enhance the crosslinking capability.

PRESENTLY PREFERRED EMBODIMENTS

The following examples are to illustrate the invention without limiting its scope. Parts and percentages are by weight unless otherwise stated.

EXAMPLE 1

(a) Preparation Of The Carboxylic Compound 130 g diethylaminopropylamine (1 mole) are dissolved in 244 g toluol and are reacted at 60° C. to 70° C. with 304 g of a toluylene diisocyanate semi-blocked with 2-ethylhexanol (1 mole) to an NCO-value of zero. After addition of 148 g o-phthalic acid anhydride (1 mole), the temperature is raised to 100° C. and the reaction is carried on until an acid value corresponding to one free—COOH group is obtained.

(b) Modification Of The Epxoy Resin

The solution according to (a) is mixed with 400 g ethoxypropanol, 60 g aminoethylpropanediol (0.5 moles), and 950 g of a commercial epoxy resin based on epichlorohydrin and bisphenol A (epoxy equivalent weight (EEW) of 475); and the blend is reacted at 85° C. to 90° C. to an epoxy value of zero. The product has an amine value of 58 mg KOH/g and is water-soluble upon addition of 45 millimoles of formic acid per 100 g resin solids.

(c) Test As A Clear Varnish

After addition of 1% by weight tin (as dibutyltindilaurate, on resin solids) and the above-mentioned quantity of formic acid, the resin is diluted with distilled water to a solids content of 15% to form a clear varnish. Zinc-phosphated steel panels, wired as the cathode of an electrodeposition system, are coated with the obtained clear varnish. The coatings are stoved for 20 minutes at 160° C. A film thickness of 22±2 μm has a resistance to methylethylketone of 300 double rubs.

EXAMPLE 2

(a) Preparation Of The Polybutadiene-Maleic Acid Anhydride-Addition Product 700 parts of a low viscous polybutadiene having a molecular weight of about 1500±15% and about 75% 1,4-cis double bonds, about 24% 1,4-trans double bonds, and about 1% vinyl double bonds are reacted at 200° C. with 100 parts maleic acid anhydride to form an addition product containing carboxylic groups.

(b) Preparation Of The Carboxylic Compound 130 g diethylaminopropylamine (1 mole) are dissolved in 240 g toluol and reacted at 70° C. to 80° C. with 608 g of a toluylene diisocyanate, semi-blocked with 2-ethylhexanol (2 moles) to an NCO-value of zero. After addition of 800 g of the polybutadiene-maleic acid anhydride-addition product (1 mole anhydride groups, prepared as set forth in (a) above), the batch is reacted until the acid value corresponds to one free—COOH group.

(c) Modification Of The Epoxy Resin

The solution prepared according to (b) above is blended with 452 g methoxypropanol, 105 g diethanol amine (1 mole), and 950 g of the epoxy resin used in Example 1 and reacted at 100° C. to an epoxy value of zero. The product, diluted with methoxypropanol to a solids content of 60%, has an amine value of 43 mg KOH/g and is water-dilutable upon addition of 45 millimoles of formic acid per 100 g of resin solids.

(d) Test As A Clear Varnish

After addition of 0.8% tin (as dibutyltindilaurate, on resin solids) and the above-mentioned quantity of formic acid, the resin is diluted with distilled water to a solids content of 15%. Cathodically deposited films on zinc-phosphated steel panels, after stoving (25 minutes/150° C.), at a film thickness of 22±2 μm, show a resistance to methylisobutylketone of 400 double rubs.

EXAMPLE 3

(a) Preparation Of The Carboxylic Compound 220 g nonylphenol (1 mole) are reacted with 102 g dimethylaminopropylamine (1 mole) and 33 g paraformaldehyde (91%, 1 mole) in the presence of 100 g toluol as azeotropic entraining agent until the stoichiometric quantity of reaction water has separated. At 50° C. the batch is blended with 312 g of an isophorone diisocyanate, semi-blocked with ethyleneglycol monomethylether (1 mole) and reacted at this temperature to an NCO-value of zero. After addition of 152 g tetrahydrophthalic acid anhydride (1 mole), the reaction is carried out at 85° C. to 90° C. until the acid value corresponds to one free—COOH group.

(b) Modification Of The Epoxy Resin

The intermediate product of (a) is blended with a solution of 475 g of an epoxy resin based on epichlorohydrin and bisphenol A (EEW of 475) in 200 g diethyleneglycol dimethylether, and the batch is reacted at 90° C. to 95° C. to an epoxy value of zero. The product has an amine value of 44 mg KOH/g and is water-dilutable upon addition of 50 millimoles formic acid per 100 g resin solids.

(c) Test As A Clear Varnish

After addition of 1.5% by weight lead (as lead octoate, on resin solids) and the above-mentioned quantity of neutralizing agent, the resin is diluted with distilled water to a solids content of 15%. The clear varnish obtained is deposited on zinc-phosphated steel panels as a film and stoved for 30 minutes at 160° C. When coated at a film thickness of 22±2 μm, the films show excellent resistance to water vapor and salt spray.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing self-crosslinking paint binders based on amino-modified epoxy resin esters comprising reacting 5 to 100 mole-% of the epoxy groups of an epoxy resin having an epoxy equivalent weight of from 160 to 2000 with a carboxylic compound of the formula $$HOOC-R_1-CO-NR_2-CO-NH-R_3-/NCO/,$$

wherein
 $R_1$ is a saturated or unsaturated aliphatic, cycloaliphatic, or aromatic hydrocarbon radical,
 $R_2$ is an aliphatic hydrocarbon radical,
 $R_3$ is an aliphatic, cycloaliphatic, or aromatic hydrocarbon radical, and
 —/NCO/ is a blocked isocyanate group, or the group —$NR_2$—CO—NH—$R_3$—/NCO/ is a radical formed from a substituted urea or a substituted biuret carrying at least one blocked isocyanate, group, and any remaining epoxy groups with primary and/or secondary amines, the weight ratios being chosen such that the final product does not contain free epoxy groups and has an amine value of at least 30 mg KOH/g.

2. The process of claim 1 wherein from 60 to 100 mole-% of the epoxy groups of an epoxy resin are reacted with the carboxylic compound and the primary and/or secondary amine.

3. The process of claim 1 wherein the reaction of the carboxylic compound and amine are carried out in separate steps.

4. The process of claim 1 wherein the reaction of the carboxylic compound and amine are carried out jointly.

5. The process of claim 1 wherein $R_2$ is a hydrocarbon radical carrying a tertiary amino group.

6. The process according to claim 1 wherein the carboxylic compound is a reaction product of a substituted biuret with a dicarboxylic acid anhydride or of a compound carrying dicarboxylic acid anhydride groups.

7. The process according to claim 1 wherein the reaction with the carboxylic compound with the epoxy resin is carried out at 70° C. to 120° C.

8. The process according to claim 1 wherein an addition compound of maleic acid anhydride to long chain compounds carrying isolated double bonds is reacted with a substituted urea or with a substituted biuret with ureide formation and that the obtained carboxylic compound is reacted with the epoxy resin.

9. A cationic paint binder for the formulation of paints which are water-dilutable upon protonation comprising the binder produced by the process of claim 1.

* * * * *